Oct. 5, 1965

P. L. GANT 3,210,542

PIPELINE LEAK DETECTION METHOD

Filed Sept. 28, 1961

INVENTOR.
PRESTON L. GANT

BY

ATTORNEY

United States Patent Office 3,210,542
Patented Oct. 5, 1965

3,210,542
PIPELINE LEAK DETECTION METHOD
Preston L. Gant, Ponca City, Okla., assignor to Continental Oil Company, Ponca City, Okla., a corporation of Delaware
Filed Sept. 28, 1961, Ser. No. 141,378
7 Claims. (Cl. 250—43.5)

This invention relates to an improved method for the detection and location of leaks in subterranean pipelines designed and constructed for the purpose of transporting fluid materials therethrough. More particularly, this invention is directed to an improved method for the determination of the location and intensity of leaks. This method is adaptable to those pipelines carrying both liquids and gases, and is specifically designed to be used in those instances wherein a detection device is passed through the interior of the pipeline.

The detection of leaks in subterranean pipelines carrying fluids requires improvement with respect to the accuracy of locating said leaks and estimating the size thereof, and though said several methods are generally known in the art, this is an improvement directed to increasing the quality and reliability of the information derived from leak detection efforts.

The transportation of fluids through subterranean pipelines has become a major method of transportation within the last several years, and concurrently the problems of detecting leaks in such pipelines has also become an increasingly important problem. The earliest efforts in detecting leaks in pipelines, particularly those pipelines carrying liquids, was the actual location of physical leakage at the surface at such time as the leak became sufficient to make a visible or physical deposit at the surface. This was accomplished by either walking the line or by flying over the line in low-level aircraft using various instruments and techniques. This method has obvious disadvantages and is particularly inadequate in detecting leakage in pipelines carrying gaseous fluids in that there is normally limited visible evidence at the surface. An early application of radioactive trace material was used in determining material leakage from pipelines, the normal procedure being to inject a slug of radioactive material into the pipeline and detect the leaks as they became apparent in deposits of radioactive material in the soil adjacent the leak in the pipeline being treated. The detection of such leaks was either by the application of the radioactive detection means from the exterior of the pipeline or conduit or by passing a pig containing a radioactive detection means through the interior of the pipeline. An example of the application of the radioactive detection means from a point exterior or above the pipeline is contained in U.S. 2,346,043. A co-pending application by the present inventor, patent application U.S. Serial No. 812,317, entitled, "Detection and Location of Pipeline Leaks," is an example of the application of the radioactive detection means through the interior of the pipeline. All of the methods of the prior art and teachings have disadvantages in that the results obtained by utilizing these methods provide rather inaccurate results without the particular indication of the size of the leak, etc.

An object of the present invention is to provide a method for detecting the location and intensity of leaks in a subterranean pipeline for transporting fluids.

A further object of the present invention is to provide a method of detecting and locating leaks in a subterranean pipeline in which virtually all of the leaks are located and there is no interruption in the service or usage of the pipeline.

Another object of the present invention is to provide a method for detecting leaks in a subterranean pipeline during usage in which the extraneous material introduced for detection purposes has no significantly deleterious effect upon the material transported through the line.

A still further object of the present invention is to provide a method of pipeline leak detection and location which provides that the radioactive detection means passed through the interior of the pipeline provides an extremely accurate profile of the leaks, that is, their location and the relative size or intensity thereof.

Another object is to provide a method of pipeline leak detection in which the radioactive detection means is passed through a pipeline substantially free of extraneous radioactive material, thereby avoiding inaccuracies of the prior art.

Other objects and advantages of the present invention will be apparent from the following detailed description thereof.

Broadly, the present invention is directed to a method of pipeline leak detection and location wherein a carrier liquid containing a small amount of unlabeled trace material is injected into the pipeline, said liquid being followed by an injection of a carrier liquid containing a small amount of radioactive trace material into the pipeline, said liquids being maintained as piston-like slugs by suitable pig means while being passed through the line with portions of the radioactive material being displaced through leaks into the adjacent ground. Thereafter, flush fluid is passed through the line, and a radioactivity detection means housed in a pig adapted to convey the detection means through the pipeline is introduced into and passed through the line, all without substantially interrupting the flow of fluids through the pipeline.

Figure 1:
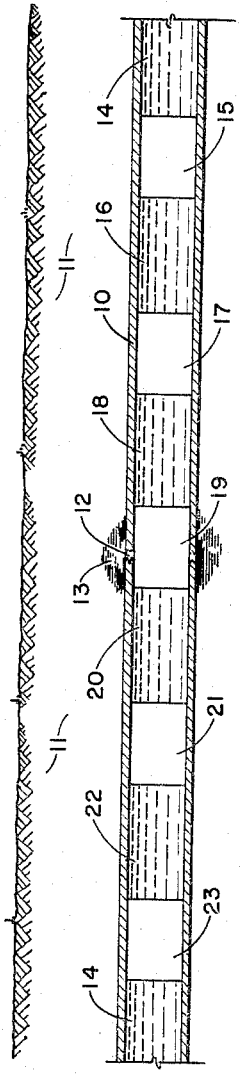
FIGURE 1 is a schematic diagram of a section of fluid carrying pipeline in which an embodiment of the present leak detection method is being practiced.

In FIGURE 1 of the drawings a fluid carrying pipeline 10, which is in a subterranean location under the ground 11, has a leak 12 as indicated by a deposit 13 of fluid in the area immediately adjacent the leak. The fluid 14 being transported by the pipeline through the particular section to be tested for leakage is temporarily suspended by proper valve means, and a pipeline pig 15 is inserted into the section of pipeline in which the flow has been suspended. After introducing the pig into the pipeline, a volume of carrier liquid 16, preferably of compatible miscibility with the fluid normally transported through the pipeline, is injected into the pipeline following the pig, said liquid containing a portion of a trace material in an unlabeled condition. Following the introduction of liquid 16, a second pipeline pig 17 is introduced into the pipeline to maintain liquid 16 as a piston-like slug, and thereafter a volume of carrier liquid 18, preferably of compatible miscibility with the fluid normally transported through the line, is injected therein, said liquid 18 containing a trace material in a tagged or labeled condition, i.e., material treated with a competent source to provide it with radioactive properties. This liquid 18 is also followed by another pipeline pig 19 to maintain it as a piston-like slug, whereafter a volume of flush material 20, that is any liquid of compatible miscibility with the fluid normally transported through the pipeline, is injected into the pipeline and followed by another pipeline pig 21. Optionally, another volume of flush material 22 can be injected into the pipeline behind the pig 21 which is also followed by a pipeline pig 23, containing the radioactivity detection and recording means, behind which the normally transported fluid 14 is again flowed through the pipeline as before the detection operation.

Figure 2:
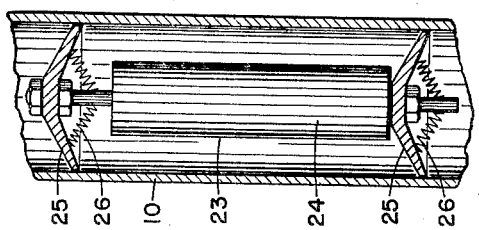
FIGURE 2 is a schematic partial cross-section of an enlarged pipeline pig having a radioactivity detection and recording means inserted in said pig.
Figure 3:
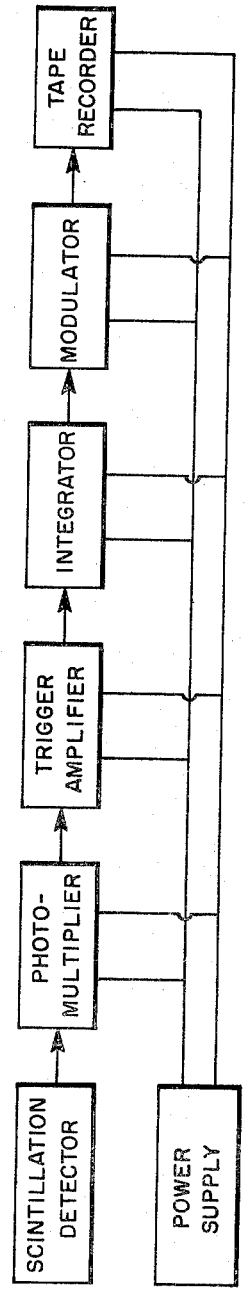
FIGURE 3 is a schematic diagram of the various elements which may be employed in the detection and recording apparatus.

Referring to FIGURE 2, the pipeline pig 23 has attached therein an instrument carrier 24 whose components are further illustrated in FIGURE 3. Instrument carrier 24 is of a cylindrical shape and capable of withstanding usual pipeline pressures, that is, 50 to 2500 p.s.i.g. Cups 25 are attached to pipeline pig 23, said cups being made of a tough, flexible material which is resistant to the liquids and gases employed in practicing the present invention, such as rubber or plastic. These cups are circular in shape and present a surface which is concave in the direction of the flow of the pipeline so that they will be capable of use as a seal against the inner wall of the pipeline. Means 26 are provided to insure a sealing relationship between cups 25 and the interior walls of the pipeline. In the embodiment shown herein these means 26 consist of expansion springs which constantly force the outwardly extending edge of cups 25 against the interior wall of the pipeline, said cups being subject to some wear during passage of the pig through the pipeline. As the cups 25 wear the pressure of springs 26 forces the cups to assume an angle with respect to the interior surface of the pipeline which is more nearly perpendicular than shown in FIGURE 2. All of the pigs employed herein, that is, pigs 15, 17, 19, 21, and 23 have cups having means for compelling the outwardly extending edges of the cups to ride against the interior wall of the pipeline. The residual film of liquid left clinging to the interior wall of the pipeline by liquid sections 16, 18, 20, and 22 provide a measure of lubrication between the outwardly extending edges of cups 25 and the interior wall of the pipeline and serve to reduce the amount of wear. With respect to pipeline pig 23, these cups also keep instrument carrier 24 located near the central axis of the pipeline. It is evident that other means can be used which provide a seal so as to prevent the substantial passage of fluids around the individual pipeline pigs. Each pipeline pig can be provided with more than two cups if desired to assist in bridging over any valve holes in the pipeline without becoming stuck in the line.

FIGURE 3 is a schematic illustration of the radioactivity detection and recording means within carrier 24 in some detail, that is, the detection and recording equipment contained within instrument carrier 24. The scintillation detector, or other suitable means for detecting the external radioactivity, detects the gamma rays emanating from the leaked radioactive material outside of the pipeline. The gamma rays are converted to flashes of light. The light is reflected to a photomultiplier where it is converted to a direct current of varying magnitude and amplified. The amplitude of the current produced therefrom is proportional to the level of radioactivity in the area detected by the scintillation detector. A trigger amplifier and integrating means are associated with the photomultiplier to provide an indication of the average current for a fixed unit of time. This average current is proportional to the radioactivity detection. This current is then manifested as an E.M.F. by means, that is, flowing current through a fixed resistor causes an E.M.F. to develop according to the law $E=IR$. E.M.F. is then modulated on to a carrier frequency which is an integral part of a tape or wire recorder. The results are permanently recorded by conventional means on the tape or wire recorder. The recorder is operated at a constant speed since the pipeline pig will pass through the line at an approximately constant rate which is relatable to the flow rate of the fluid forcing the pig through the line, thus indications of radioactivity outside the pipeline will be recorded in terms of distance along the pipeline. Odometer means can be utilized to govern the operating rate of the tape or wire recorder so as to eliminate any errors in the location of the leaks due to pulsation in the rate of flow of fluid through the pipeline.

The method of pipeline leak detection of the present invention can be applied to subterranean pipelines utilized to transport substantially any liquid fluid, for example, water, crude oil, gasoline, kerosene, and other refined petroleum products, or gaseous fluids, for example, natural gas, hydrogen, producer gas, and helium, under either extreme pressures or merely sufficient pressures to displace the material therethrough. The operation of the leak detection method is substantially the same regardless of whether the fluid being transported is in the liquid or gaseous state.

The section of the pipeline to be subjected to testing is prepared for such by providing the necessary means for temporarily isolating the section by the conventional valve means normally provided at intervals in the line in order that the testing materials can be introduced in the line between the pigs. Appropriate provisions must be established for introducing and removing the pigs and testing liquids into the line which are accomplished in the conventional manner by way of an enlarged scraper trap or by cutting an opening in the line. The series of pipeline pigs and testing liquids are normally introduced into the line in such a manner that the displacement thereof is in the usual direction of the flow of fluid therethrough.

The pigs passed through the line to maintain the desired separation of fluids are conventional pigs similar to the one illustrated in FIGURE 2, except for the inclusion of the detection means contained therein. After the section of the line to be tested has been adapted for testing as described above, the flow of fluid 14 is suspended to enable the introduction of the first pig 15 and the unlabeled trace material in a carrier liquid 16. The unlabeled trace material is the initially introduced testing liquid and is placed in the line for the purpose of preventing subsequent inaccuracies in the data to be derived. Upon being introduced into a pipeline the trace material in the labeled or unlabeled condition forms deposits within the interior of the pipeline. These deposits are formed by the absorption, adsorption or chemical reactance of the material with the interior of the pipe at places wherein there are incongruities, contaminants, or breaks in the line, particularly at positions of leakage where oxidation, corrosion and paraffin deposits exist. The improvement of this method is the introduction of unlabeled trace material into the line whereby this material is deposited within the pipeline to a substantially complete degree making it impossible for further trace material to be deposited therein. This deposition of unlabeled trace material prevents the occurrence of any significant chemical or physical deposit of the labeled trace material introduced subsequent thereto, as described hereinbelow. This initial volume of trace material is injected in an amount dependent upon the length, condition of the section of line to be tested, and concentration of the trace material in the carrier liquid, that is, the amount is to be sufficient to contact the interior of the section so completely as to prevent any excess deposit of labeled trace material as discussed above. In general, the unlabeled trace material is injected in an amount from about 10 to about 100 pounds per 1000 barrels of carrier liquid, and, though it is possible to use larger amounts, it is without commensurate advantage as the foregoing concentration provides sufficient trace material to compensate for leakage, deposition, and an adequate reactance period. The preferable concentration is from 20 to 50 pounds of unlabeled trace material per 1000 barrels of the carrier material. The amount of carrier material to be utilized is dependent upon the individual situation and the judgment of one in the pipeline art, but the amount is normally that which is sufficient to provide a slug of material of the requisite size to contact the entire interior of the line for the distance of the section being tested for a sufficient time to allow an adequate period for physical and chemical reactance between the trace material and pipe. The exact amount needed is dependent upon numerous factors such as size of line, speed of flow, pressure, fluids involved, etc., but this amount is readily determinable by one skilled in the art having such information for a specific situation.

After the unlabeled trace material is injected into the line, another pig 17 is introduced therein, and followed by the injection of an amount of labeled trace material in a carrier liquid 18. This trace material is previously subjected to treatment with an appropriate radioactive source so as to render it in condition to emit radioactivity for a limited period of time. The labeled material is injected in an amount sufficient to completely contact the interior of the pipeline and be displaced into the earth adjacent any leaks in the line for the length of the section being tested, such labeled trace material is injected in a concentration of about 0.02 to about 1.0 pound of trace material per 1000 barrels of carrier, preferably from 0.05 to 0.2 pound per 1000 barrels of carrier. The labeled trace material can be used in greater concentrations, but there is no advantage, particularly in that the decay time of the material and safety problems during handling and removal from the line are increased without improving the results.

Thereafter another pig 19 is introduced into the line and a volume of flush fluid 20 injected therein. The flush fluid, in liquid or gaseous form, preferably a liquid of compatible miscibility with the carrier liquid for the trace material, is injected into the line to displace the trace material and carrier therefrom, particularly the radioactive or labeled trace material from the interior of the line. This flush fluid can be the fluid normally transferred through the line, or the displacement of another amount of unlabeled trace material in carrier, as above, is not infrequently advantageous. At this point it is often desirable to introduce another pig 21, and volume of flush fluid 22 as illustrated in FIGURE 1. The volume of flush fluid passed through the section of line containing the radioactive trace material must be sufficient to displace substantially all of this material from the line in order to obtain accurate data and prevent subsequent product contamination. The amount of flush fluid necessary to clear the pipeline is obviously dependent upon the individual situation and can be most readily determined by monitoring the flush material for radioactivity level as the fluid is withdrawn from the line. At such time as the radioactive material content of the flush fluid is sufficiently low as measured by conventional means, the injection of flush fluid can be terminated and the next step of the method conducted. A supplementary determination of the radioactivity remaining in the line and fluids can be accomplished by monitoring the pipeline pigs by conventional radioactivity detection means located externally along the line as the pigs normally reflect concentrations of any radioactivity as they pass through the line accumulating paraffin and other deposits within the line. A modification to the above procedure for purging the radioactive material from the line is to inject another volume or slug of carrier liquid containing a small amount of unlabeled trace material into the pipeline, either in lieu of the flush fluid above or in combination, preceding and/or following, with the above described injection of flush fluid to remove the radioactive trace material from the line.

After the injection of sufficient flush fluid to render the interior of the line in the test section substantially free of radioactive material, a pig containing suitable detection device, reference 23 in the drawings, is introduced into the line. The flow of the normally transported fluid is again commenced, ending the temporary suspension of flow whereby essentially continuous use of the pipeline is maintained, to displace the series of test fluids and pigs through the line. As the test fluids flow past a leak in the line, a portion of the fluids are displaced into the earth about the line thereby causing a portion of the radioactive trace material to be displaced through the leak holes and deposited in the earth surrounding the line. The amount of displacement and size of the deposit of radioactive material is directly proportionate to the size of the leak, and more particularly to the effective loss size of the leak, in that the displacement is caused by the normal flow of the fluid regularly transported through the line since the line is used without significant interruption or variance from the normal manner of operation.

The fluids and pigs introduced into the pipeline for testing purposes are removed through appropriate means in the line, such as a scrapper trap, at the end of the section of line tested to prevent contamination or disruption of the line, with the materials having an undesirable level of radioactivity being placed in separate facilities for retention until there has been sufficient decay of the radioactivity to allow further handling with safety. Upon removal of pig 23 from the line, the recording is recovered from the instrument carrier 24. The recording provides a record of data as to radioactivity level at various points along the length of the section which are interpreted by those skilled in the art to determine the location and intensity of leaks in the conventional manner.

As stated, the carrier liquid for the labeled and unlabeled trace materials is of compatible miscibility with fluid being transported in the pipeline, so the trace material is preferably a material which is soluble in the carrier liquid. The radioactive material used for testing lines carrying hydrocarbon fluids must be soluble in hydrocarbons, such radioactive materials being organic derivatives of iodine 131 (which has a half-life of 8 days), bromine 82 (which has a half-life of 36 hours), or other short half-life elements. These radioactive materials are introduced in a very low concentration into the hydrocarbon carrier which is injected into the pipeline, normally an amount in the order of 01 to 1 percent concentration. For example, to a pipeline in which gasoline is flowing there may be injected a solution of approximately 0.1 to 10 grams of radioactive dibromobenzene, ethylenebromide or dibromononene in approximately 0.5 to 5 kilograms of gasoline. The radioactive organic compound has a specific activity on the order of 200 millicuries per gram. When higher specific radioactivity radio isotopes are used, the weight may be proportionately less in light of the above example; and, when using lower specific activity radio isotopes, the weight must be proportionately greater. This solution of radioactive material is rapidly injected into the gasoline in the line and forms a radioactive slug, that is, flowing section of radioactive gasoline in the pipeline. This radioactive slug flows in the line and portions of it leak through holes through the line and saturate the ground adjacent these holes, thereafter gasoline is allowed to flow in the pipeline past the point of injection for approximately 15 minutes to 2 hours to flush the interior surface of the line free of radioactive material. In the application of the present invention the pipeline wherein gaseous hydrocarbons are being transported a similar procedure is followed though the flush may be accomplished by either more of the injected liquid hydrocarbons utilized as the carrier or in the event that the carrier is of sufficiently high volatility, the normal transported gaseous material may be utilized as the flush material by merely volatilizing the radioactive material and carrier from the pipeline.

The application of the present invention to a pipeline utilized to transport liquids other than hydrocarbons, such as water, require that the radioactive trace material be of such a nature as to be compatable with a carrier which will not contaminate the line for the normally transported liquid. As an example of the use of the present method in a pipeline used to transport aqueous liquids, typical radioactive materials which can be utilized as the trace materials are potassium bromide (Br 82), potassium iodine (I 131), rubidium chloride (Rb 86), lanthanum chloride (La 140) and numerous others known in the art.

The present invention specifically avoids the inaccuracies and disadvantages of the prior art which occur due to the reaction of the radioactive trace material either chemically or physically attaching to the interior of the pipeline in the embodiment of FIGURE 1 in which unlabeled trace material is injected prior to the injection of the radioactive or labeled trace material. This reacts within the line at leaks and other points wherein rust or other materials are present to form the nonradioactive deposits of trace material in the pipeline, which is significant because such deposits are not displayed by the volume of labeled trace material and carrier to allow deposits of radioactive materials. The subsequent slug of radioactive trace material is therefore displaced through the line wherein there is no possibility that further trace material can be deposited in the line interior to cause inaccurate or unreliable results. Therefore the radioactive trace material is either displaced through leaks into the earth for subsequent detection, or it is displaced on through the pipeline by the flush fluids. The purpose of the foregoing is to provide a pipeline interior substantially free of all radioactivity through which the radioactivity detection means is passed. Deposits of the trace material are frequently not completely removed from the pipeline by the flush fluid, so the advantages of having such deposits of an unlabeled, rather than a labeled or radioactive, material are obvious. Otherwise, as in the prior art, there are undesirable deposits of radioactive material within the line indicating the presence of nonexistent leaks.

This will means that the radioactivity detention means is brought into contact with only those amounts of radioactive material which have been actually displaced into the formation through leaks in the pipeline, and there can be no distortion due to prior radioactive deposits within the pipeline itself. The piston-like slugs of fluids passed by the leaks in the pipeline provide relatively uniform zones of fluid, that is, that the materials will pass through the leaks in the upper portion as well as the lower portion of the pipeline, thereby insuring that the leaks in the upper portion of the pipeline are subjected to detection as well as those in the lower portion.

The amount of radioactive material leaking to the outside of the pipeline depends upon the size of the leak in the line, and the recorded radioactivity level provides an indication of the size of the radioactive deposit about the leaks. The pressure, rate of flow, and volume of labeled material and carrier in the line are known factors which make it possible to calibrate the detection means passed through the line and determine the specific location of leaks. After calibration the level of the radioactivity can be expressed in the recording equipment in terms of cubic feet or of fluid leaked per minute or other suitable volumetric rate expression. This accuracy is greatly enhanced over the prior art in that there are no levels of radioactivity indicated on the recording from the deposition of radioactive material within the interior of the pipeline, rather than the exterior thereto.

From the foregoing detailed description of the invention, it is apparent that many variations may be made without departing from the spirit and scope thereof, but the present invention is intended to be limited only in accordance with the following claims:

I claim:

1. A method for detecting and locating leaks in a fluid-carrying, subterranean pipeline which comprises:
   (a) introducing a first pig means into said pipeline thereby maintaining fluid already in the pipeline as a piston-like slug physically separate from a subsequently injected first fluid containing nonradioactive trace material;
   (b) injecting a first fluid containing non-radioactive trace material into said pipeline;
   (c) introducing a second pig means into said pipeline thereby maintaining said first fluid as a piston-like slug physically separate from a subsequently injected second fluid containing radioactive trace material;
   (d) injecting a second fluid containing radioactive trace material into said pipeline;
   (e) introducing a third pig means into said pipeline thereby maintaining said second fluid containing radioactive trace material as a piston-like slug physically separate from fluid following in said pipeline;
   (f) moving said pigs and piston-like slugs of fluid intermediate thereof through said pipeline by flowing fluid therethrough, whereby said first fluid precedes said second fluid and said nonradioactive trace material in said first fluid is deposited at all available points of deposit on the interior of said pipeline thereby preventing the subsequent deposition of said radioactive trace material from said second fluid following;
   (g) introducing a means into said pipeline for detecting and recording the presence of radioactive material;
   (h) recovering said means from said pipeline; and
   (i) removing recorded information from said means for presentation in terms of location of radioactive deposits adjacent said pipeline.

2. A method for detecting and locating leaks in a fluid-carrying, subterranean pipeline which comprises:
   (a) introducing a first pig means into said pipeline thereby maintaining fluid already in the pipeline as a piston-like slug physically separate from a subsequently injected first fluid containing non-radioactive trace material;
   (b) injecting a first fluid containing non-radioactive trace material into said pipeline;
   (c) introducing a second pig means into said pipeline thereby maintaining said first fluid as a piston-like slug physically separate from a subsequently injected second fluid containing radioactive trace material;
   (d) injecting a second fluid containing radioactive trace material into said pipeline;
   (e) introducing a third pig means into said pipeline thereby maintaining said second fluid containing radioactive trace material as a piston-like slug physically separate from fluid following in said pipeline;
   (f) moving said pigs and piston-like slugs of fluid intermediate thereof through said pipeline by flowing fluid therethrough, whereby said first fluid precedes said second fluid and said nonradioactive trace material in said first fluid is deposited at all available points of deposit on the interior of said pipeline thereby preventing the subsequent deposition of said radioactive trace material from said second fluid following;
   (g) injecting a flush fluid into said pipeline to purge radioactive trace material therefrom;
   (h) introducing a means into said pipeline for detecting and recording the presence of radioactive material;
   (i) recovering said means from said pipeline; and
   (j) removing recorded information from said means for presentation in terms of location of radioactive deposits adjacent said pipeline.

3. A method for detecting and locating leaks in a fluid-carrying, subterranean pipeline as set forth in claim 1 further characterized in that the fluid carried by said pipeline is a hydrocarbonaceous liquid.

4. A method for detecting and locating leaks in a fluid-carrying, subterranean pipeline as set forth in claim 1 further characterized in that the fluid carried by said pipeline is an aqueous liquid.

5. A method for detecting and locating leaks in a fluid-carrying, subterranean pipeline as set forth in claim 1 further characterized in that the fluid carried by said pipeline is a gas.

6. A method for detecting and locating leaks in a fluid-carrying, subterranean pipeline as set forth in claim 1 further characterized in that said first and second liquids are of compatible miscibility with the fluid carried in said pipeline.

7. A method for detecting and locating leaks in a fluid-carrying, subterranean pipeline as set forth in claim 1 further characterized in that said trace material is substantially soluble in said first and second liquids.

References Cited by the Examiner

UNITED STATES PATENTS 2,940,302  6/60  Scherbatskoy _____ 250—106 X
3,011,054  11/61  Jefferson et al. _____ 250—106 X

OTHER REFERENCES

Application of Radioisotopes to Leakage and Hydraulic Problems, by Putman et al., from International Conference on Peaceful Uses of Atomic Energy, United Nations Press, New York, N.Y., 1956, vol. 15, pp. 147–150.

RALPH G. NILSON, *Primary Examiner.*